United States Patent
Smith

(10) Patent No.: US 10,711,819 B2
(45) Date of Patent: Jul. 14, 2020

(54) PIN

(71) Applicant: Three Smith Group Limited, Elland, West Yorkshire (GB)

(72) Inventor: Luke Smith, Halifax (GB)

(73) Assignee: THREE SMITH GROUP LIMITED, Elland (GB)

( * ) Notice: Subject to any disclaimer, the term of this patent is extended or adjusted under 35 U.S.C. 154(b) by 616 days.

(21) Appl. No.: 15/513,934

(22) PCT Filed: Sep. 23, 2015

(86) PCT No.: PCT/GB2015/052754
§ 371 (c)(1),
(2) Date: Mar. 23, 2017

(87) PCT Pub. No.: WO2016/046546
PCT Pub. Date: Mar. 31, 2016

(65) Prior Publication Data
US 2017/0261024 A1    Sep. 14, 2017

(30) Foreign Application Priority Data

Sep. 23, 2014 (GB) .................................. 1416801.7

(51) Int. Cl.
*F16B 19/00* (2006.01)
*F16B 37/14* (2006.01)
*E04H 17/14* (2006.01)

(52) U.S. Cl.
CPC ....... *F16B 19/008* (2013.01); *E04H 17/1413* (2013.01); *F16B 37/14* (2013.01); *E04H 2017/146* (2013.01)

(58) Field of Classification Search
CPC .... F16B 37/14; F16B 33/004; Y10S 411/947; Y10S 411/907; E04H 17/1413;
(Continued)

(56) References Cited

U.S. PATENT DOCUMENTS 3,693,495 A * 9/1972 Wagner ................. F16B 23/003
411/377
3,885,492 A    5/1975 Gutshall
(Continued)

FOREIGN PATENT DOCUMENTS

| JP | S59-79615 U | 5/1984 |
|----|-------------|--------|
| JP | S61-52406 A | 3/1986 |

(Continued)

OTHER PUBLICATIONS

Dec. 7, 2015 International Search Report issued in International Patent Application No. PCT/GB2015/052754.
(Continued)

*Primary Examiner* — Jonathan P Masinick
(74) *Attorney, Agent, or Firm* — Oliff PLC

(57) ABSTRACT

A pin having a tool engagement portion and a resiliently deformable cover arranged over the tool engagement portion. The resiliently deformable cover is operable to deform from a first position to a second position to allow for the engagement of the tool engagement portion with a tool. The tool engagement portion is substantially concealed when the cover is in the first position, reducing the opportunities for dirt ingress. A tool may be used to deform the cover and allow the tool to engage with the tool engagement portion such that rotation of the tool causes co-rotation of the pin.

15 Claims, 3 Drawing Sheets

(58) Field of Classification Search
CPC ............... E04H 17/14; E04H 17/1421; E04H 2017/1447; E04H 2017/1452
See application file for complete search history.

(56) References Cited

U.S. PATENT DOCUMENTS

| | | | | |
|---|---|---|---|---|
| 3,960,047 | A * | 6/1976 | Liffick | B60B 3/16 411/429 |
| 4,018,133 | A * | 4/1977 | Chaivre | F16B 37/14 411/429 |
| 4,316,690 | A * | 2/1982 | Voller | F16B 33/004 411/377 |
| 4,457,654 | A | 7/1984 | Sygnator | |
| 6,186,719 | B1 * | 2/2001 | Chou | F16B 37/14 411/303 |
| 6,827,539 | B2 * | 12/2004 | Somers | F16B 37/14 411/375 |
| 8,485,910 | B2 * | 7/2013 | Selle | B23K 11/14 411/177 |
| 2014/0294532 | A1 | 10/2014 | Plzak | |
| 2016/0208844 | A1 * | 7/2016 | Wilson | F16B 37/14 |

FOREIGN PATENT DOCUMENTS

| | | |
|---|---|---|
| JP | H05-92522 U | 12/1993 |
| JP | 2004 275681 A | 10/2004 |
| WO | 02/44476 A1 | 6/2002 |

OTHER PUBLICATIONS

English-language translation of Jul. 9, 2019 Office Action issued in Japanese Patent Application No. 2017-516119.
Nov. 27, 2014 Office Action issued in British Patent Application No. 1416801.7.

* cited by examiner

PIN

FIELD

The present invention relates to a pin. In particular, the invention relates to a pin having reduced areas for dirt ingress for use in a barrier such as a safety barrier or the like.

BACKGROUND

Pins are used in safety barriers to secure together discrete components, such as posts and rails of a barrier system. Such barriers systems may, for example, be designed to prevent shelving from being directly impacted by vehicles.

To improve stability, pins are commonly locked into place by the rotation of the pin. A tool, such as a screwdriver, is normally used to provide increased mechanical advantage for the rotation of the pin in order to achieve sufficient tightening and to enable the pin to be removed.

The interaction between a pin and a tool is normally in the form of cooperating male and female components. Usually, the pin contains the female component and the tool the male component. Engagement of the tool and the pin requires that the surfaces of the components abut such that rotation of the tool causes the pin to co-rotate.

In such areas where a relatively high level of cleanliness is required, such as area where food is stored and/or processed, it is important to ensure that there is a low level of dirt and the like. However, the presence of projections and/or recesses in the pins as a result of the male or female components can provide areas for dirt to gather. It will often be a laborious task to remove the dirt from these areas, and dirt can often be missed.

SUMMARY

It is an object of the present invention to attempt to overcome at least one of the above or other disadvantages. It is a further aim to provide a pin that reduces the areas for dirt to gather and increase the ease with the pin may be cleaned whilst still permitting for a tool to be used to provide improved mechanical advantage for the insertion and removal of the pin.

According to the present invention, there is provided a pin as set forth in the appended claims. Other features of the invention will be apparent from the dependent claims, and the description which follows.

In the exemplary embodiments pins are described having a tool engagement portion and a resiliently deformable cover. It will be clear to those skilled in the art that a pin commonly also comprises a head portion and a shank. The head generally comprises a portion having a wider circumference than the shank such as to help determine the extent of the insertion of the pin into a recess. The shank generally forms the part of the pin that provides the structural rigidity to hold the attached components in place. The shank may also comprise fixing means such as a form of screw thread or bayonet type of fixing projections. Such forms of pin commonly required rotation of the pin is required to fix it in place. As such, the head may also comprise means for engaging with a tool that allows for increased mechanical advantage to be leveraged in the rotation of the pin, whether that is to tighten or loosen the pin.

According to a first aspect there is provided a pin having a tool engagement portion and a resiliently deformable cover arranged over the tool engagement portion. The resiliently deformable cover is operable to deform from a first raised position to a second lowered position to allow for the engagement of the tool engagement portion with a tool. Generally, the contours of the tool engagement position are substantially not present in the upper face of the pin when the cover is in the first raised position. Upon deformation of the cover to the second lowered position contours similar to those of the tool engagement portion become present in the upper face of the pin. Suitably, when the deformable cover is deformed from a first raised position to a second lowered position a portion of the upper face of the cover is moved from a first raised position to the second lowered position. Typically, a portion of the upper face of the deformable cover maintains substantially the same orientation in the second position as the first position, such as substantially having a plane along the lateral cross-section of the pin. Typically, a portion of the upper face of the deformable cover is moved from a plane substantially along the lateral cross-section of the pin to a plane substantially along a longitudinal cross-section of the pin.

The cover may be formed of any suitable resiliently deformable material. Suitably, the cover is at least partially formed from one or more of the materials selected from TPE Rubber, TPU, Silicon rubber, elasticated rubber or any other suitable elasticated material. Generally, the portion of the cover formed from one or more of the above materials will be the portion arranged over and immediately around the tool engagement portion of the pin.

In the exemplary embodiments, the resiliently deformable cover may provide a substantially smooth surface in the first position. For example, the upper face of the deformable cover may comprise substantially no sharp angles or deep recesses in the first position. "Sharp angles and deep recesses" as used herein being intended to be relative to the angles and recesses of the tool engagement portion. The upper face of the deformable cover may comprise an undulating surface such that portion of the surface comprises projections or are of a curved nature, such as convex or sloped when viewed from above. Suitably, the substantially smooth surface is present over the upper face of the head of the pin, such as substantially the whole upper face of the head of the pin.

In the exemplary embodiments, the resiliently deformable cover in the first position may comprise a ridge of resiliently deformable material. The ridge may extend from the upper face of the cover. The ridge may comprise a sloped upper face. Typically, the ridge is at least partially formed of resiliently deformable material, suitably the same resiliently deformable material as the remainder of the cover. The ridge may comprise a region of increased thickness relative to a portion of the cover substantially surrounding the ridge. The ridge may comprise the thickest portion of the cover. Typically, the ridge provides a thickness of resiliently deformable material of between 0.001 m to 0.0015 m. The portion of the cover arranged within the inner edge of the ridge suitably has a thickness less than the thickness of the ridge.

In the exemplary embodiments, the ridge may provide an indication of the location of the tool engagement portion of the pin. As such, the ridge may be a guiding ridge. The ridge may extend at least partially around substantially the periphery of the tool engagement portion. Typically, at least a portion of the inner edge of the ridge is arranged substantially longitudinally above at least a portion of the periphery of the tool engagement portion. Suitably substantially all of the inner edge of the ridge is arranged substantially longitudinally above at least a portion of the periphery of the tool engagement portion. The inner edged of the ridge may have substantially the same shape as the periphery of the tool engagement portion. In such an embodiment, the ridge provides a relatively shallow impression of the shape of the tool engagement portion of the pin. This arrangement helps to reduce the depth to which the upper face of the cover must deform before the tool is able to cause co-rotation of the pin.

Advantageously, the ridge of the deformable cover also allows a user to quickly and easily located the concealed tool engagement portion of the pin. Such a feature may reduce unnecessary damage to the cover caused by misplaced impacts of the tool against areas of the cover which are not arranged over the tool engagement portion. Furthermore, by providing an excess of resiliently deformable material adjacent to the tool engagement portion, the ridge may spread the stress suffered by the cover during engagement of a tool over a relatively large amount of material.

In the exemplary embodiments, the resiliently deformable cover may be in the form of a cap. The cap may be comprised of an upper wall and a skirt. Suitably, the upper wall and the skirt are formed of resiliently deformable material. Typically, the skirt extends from the periphery of the upper wall, such as from substantially the outer edge of the upper wall. The skirt may extend around substantially the whole periphery of the upper wall. Suitably, the cap forms a tight abutting fit around the pin.

Advantageously, a cover in the form of a cap provides the terminable edges of the cover longitudinally distal to the upper edge of the pin such that, in use, when the upper edge of the pin is substantially flush with a surrounding barrier part the terminal edges of the cover are hidden from view, thus further reducing the points at which dirt may ingress. This arrangement may also help to improve the integrity of the cover such as to improve resistance to lifting of the cover in use.

In the exemplary embodiments, the resiliently deformable cover may be removable. The resiliently deformable material of the cover may degrade at a faster rate than the other material of the pin. As such, it is advantageous that the cover may be removed and replaced to extend the lifetime of the remainder of the pin.

In the exemplary embodiments, the pin may further comprise a lip. The lip may be arranged toward the upper face of the pin. Suitably, the lip extends substantially perpendicularly to the side wall of the pin. Suitably, the lip is formed of a substantially non-deformable material, such as a non-deformable metal. The lip may engage with the resiliently deformable cover such that the cover is overstretched. Suitably, the cover, for example the skirt of the cover, abuts opposite faces of the lip when in the first position.

Advantageously, the lip may help to hold the cover in place as well as helping to form a close fit between the cover and the remainder of the pin.

In the exemplary embodiments, the tool engagement portion provides means for engagement with a tool such that rotation of the tool causes co-rotation of the pin. Typically, the pin comprises a female tool engagement portion operable to engage with the male projection of an appropriate tool. Suitably, the tool engagement portion comprises a recess, the recess extending into the body of the pin, suitably extending substantially longitudinally into the body of the pin. Typically, the recess extends substantially perpendicularly from the surrounding upper face of the pin. The tool engagement portion is generally formed of a substantially non-deformable material, such as a non-deformable metal.

In the exemplary embodiments, the recess of the tool engagement portion may have a substantially curved perimeter. For example, a perimeter in substantially the shape of an oval. Suitably, the peripheral shape of the recess substantially avoids sharp angles, such square edged corners. Suitably, the peripheral shape of the recess contains only curved corners.

Advantageously, the use of curves and the avoidance of sharp angles helps to avoid focusing stress on relatively small areas of the cover by providing a more uniform distribution of the stress, thus extending the life of the cover.

In the exemplary embodiments, the recess may extend along substantially the whole longitudinal length of the pin. Suitably, the recess does not extend the whole longitudinal length of the pin. As such, typically the pin comprises an open end, that is the end at which the female tool engagement portion is arranged, and closed end.

Advantageously, the presence of a recess extending a substantial distance into the pin reduces the amount of material required to manufacture the pin and thus lower the cost of manufacturing the pin.

In the exemplary embodiments, the pin may comprise fixing means operable to upon actuation substantially prevent removable of the pin. Suitably, the fixing means of the pin are actuated by rotation of the pin. The fixing means of the pin may comprise fixing means such as a screw thread and/or bayonet projections. Typically, the fixing means comprise at least one bayonet projection, such as two bayonet projections. Suitably the bayonet projections are arranged at diametrically opposed positions on the pin.

In the exemplary embodiments, the pin may further comprise a sheath. The sheath is generally operable to be arranged over a portion of the shank of the pin such as to encase a portion of the shank of the pin in use. As such, the sheath may comprise larger lateral dimensions than the lateral dimensions of the shank of the pin. In use in a barrier system, the sheath may be operable to be inserted in the opposite end of the aperture through which a pin is to be inserted, or operable to be inserted through an aperture substantially opposite the aperture through which the pin is to be inserted. Suitably, once the pin is engaged at least partially within the sheath, the pin is rotated within the sheath to secure the pin in position. It will be apparent that a resiliently deformable cover and tool engagement portion of the pin may alternatively, or additionally, be arranged on the closed end of the sheath such as to allow rotation of the sheath with an appropriate tool.

In the exemplary embodiments, the sheath may comprise an open end and a closed end. Suitably, the open end of the sheath is operable to receive at least a portion of the shank of the pin. The sheath may further comprise a flange. Suitably, the flange is arranged toward an end of the sheath. The flange of the sheath may be arranged toward the closed end of the sheath, typically arranged at the upper edge of the closed end of the sheath. The flange may provide a continuation of the upper face of the closed end of the sheath beyond the sidewalls of the sheath. The exterior surface of the flanged closed end of the sheath may be substantially smooth. The sheath may comprise the complementary fixing means to the fixing means of the pin. For example, where the pin comprises bayonet fixing means, the sheath may comprise a channel operable to receive the bayonet fixing means. Typically, the channel comprises an L-shaped portion, a portion of which is operable to receive a respective bayonet fixing means upon rotation of the pin into the locked position in a manner known in the art.

Advantageously, by providing the complimentary fixing means in the sheath to the fixing means of the pin, components to be fixed together are not required to comprise such fixing means. As such, the pin may be used with any components having only an aperture passing there through.

According to a second aspect, there is provided a kit of parts having a pin according to the first aspect and a tool. This tool is operable to engage the tool engagement portion of the lock pin such that, when engaged, rotation of the tool causes rotation of the pin. Using such a tool the pin may be locked in position during assembly and unlocked to remove the pin during disassembly. The tool is operable to deform the cover from the first position to the second position, wherein the tool may engage the tool engagement portion of the pin such that rotation of the tool causes co-rotation of the pin. It will be clear that the phrase "engage the tool engagement portion" when used herein refers to the cover deforming to an extent that allows rotation of the tool to cause co-rotation of the pin. Engagement of the tool with the tool engagement portion is thus commonly via the material of the cover. Generally, the tool engagement portion provides a mould into which the cover may deform thereby providing the shape appropriate for the tool engage with the pin in order to cause co-rotation of the pin.

In the exemplary embodiments, the tool may comprise projections operable to limit the depth of the insertion of the tool into the tool engagement portion of the pin, in use. Suitably, the projections are operable to engage with a portion of the cover not arranged over the tool engagement portion of the pin. The projections may be operable to engage with the ridge of the cover. Typically, the projections provide a substantially planar lower face that is operable to engage with the upper face of the cover. The projections may be in the form of at least two outwardly extending projections. The projections may be spaced about 180° apart.

Advantageously, the projections of the tool prevent the tool from being inserted too deeply into the tool engagement portion.

According to a third aspect, there is provided a barrier assembled from parts, the parts comprising: first and second spaced posts; and a first rail interconnecting said first and second posts, wherein the rail is not inserted within the posts; characterised in that the first post, second post, and rail are hollow in at least the region of the intended interconnection and each post includes an aperture and is connected to the rail by a coupling, wherein the coupling includes a connector; the connector is arranged to extend through the aperture so that a first portion of the coupling is arranged inside the hollow region of the post and a second portion of the coupling is arranged inside the hollow region of the rail; and the connector includes an abutment that is able to be arranged to prevent movement of the connector through the aperture in use, and able to be arranged to allow movement of the connector to allow disassembly of the rail from the post by allowing the connector to withdraw from one of the post or rail, wherein the parts further comprise a pin according to the first aspect.

In the exemplary embodiments, the terminal edges of the resiliently deformable cover may be hidden from view, in use.

In the exemplary embodiments, the upper face of the pin may be substantially flush with the upper face of the respective surrounding post or rail, in use.

BRIEF DESCRIPTION OF DRAWINGS

For a better understanding of the invention, and to show how embodiments of the same may be carried into effect, reference will now be made, by way of example, to the accompanying diagrammatic drawings in which.

DESCRIPTION OF EMBODIMENTS

Figure 1:
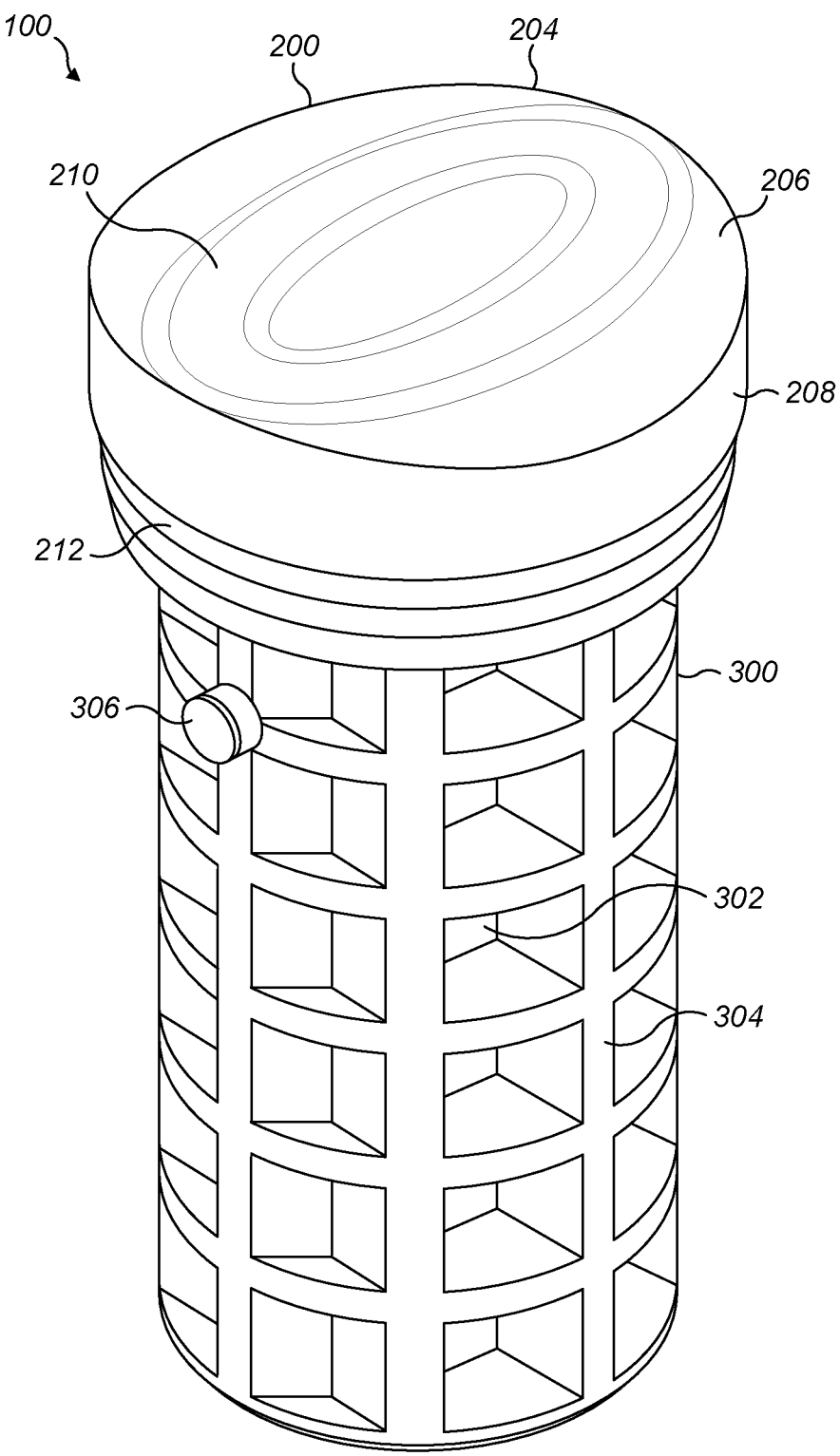
FIG. 1 shows a perspective view of a pin according to an embodiment of the present invention.
Figure 2:
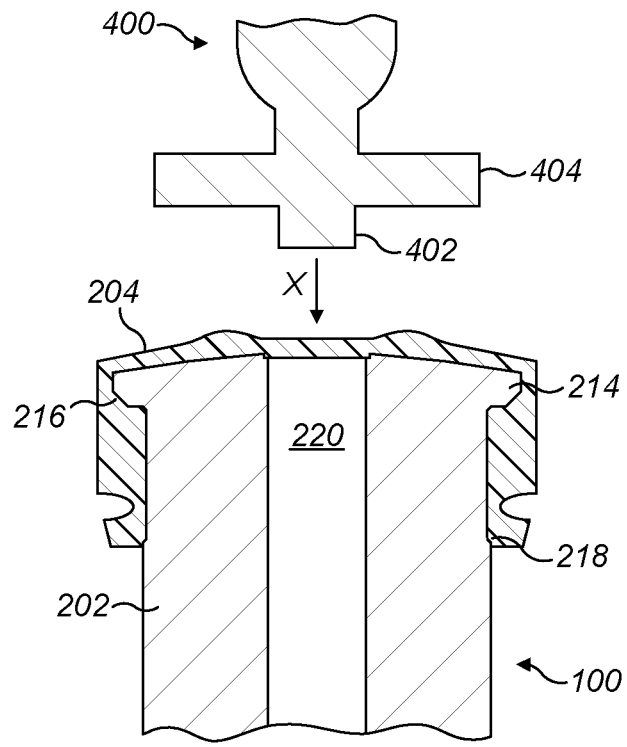
FIG. 2 shows a side cross-sectional view of a pin comprising a pin and tool operable to engage the tool engagement portion of the pin.
Figure 3:
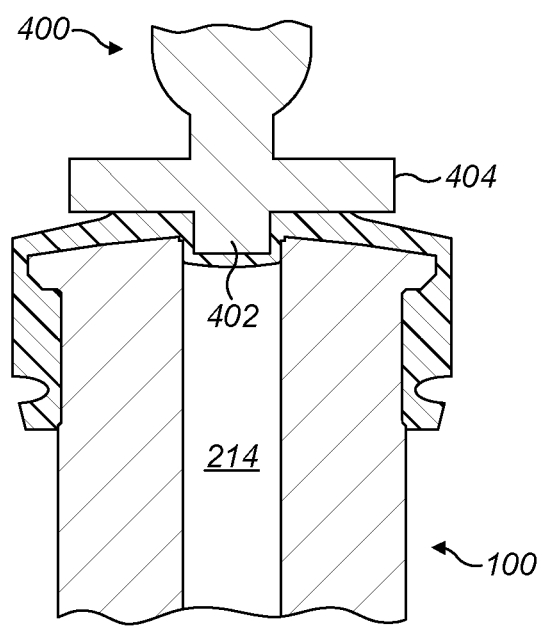
FIG. 3 shows a side cross-sectional view of a pin comprising a pin engaged with a tool.

Referring to FIGS. 1 to 3 there is shown pin 100. The cylindrical elongate pin 100 comprises head 200 and shank 300 extending co-axially therefrom. Head 200 comprises solid steel core portion 202 and resiliently deformable elastomeric cap 204. Cylindrical core portion 202 has lip 214 extending perpendicularly around the top edge thereof and ramp 216 arranged below lip 214, ramp 216 extending around the circumference of the core portion 202. Lip 214 has sloping side face 216. The upper face of core portion 202 is convex when viewed from above. Extending longitudinally inward from the upper face of core portion 202 is oval shaped recess 220.

Cap 204 is formed of top wall 206 and skirt 208, skirt 208 extending perpendicularly from the edge of top wall 206. Top wall 206 has oval shaped curved ridge 210 arranged centrally thereon and extending upwards from the upper face. Arranged on outer face of skirt 208 is linear channel 212. Channel 212 extends around the circumference of skirt 208 and is arranged toward and parallel with, but inwardly spaced from, the lower edge of the skirt 208.

Cap 204 is arranged over core portion 202 such that the inner face of top wall 206 tightly abuts the upper face of core portion 202 and the inner face of skirt 208 tightly abuts around the side face of core portion 202. Lip 214 extends into the resiliently deformable material of skirt 208. Cap 204 is arranged over the core portion 202 of head 200 such that the inner edge of ridge 210 is arranged substantially directly above the perimeter of recess 220.

Shank 300 has core portion 302 and outer layer 304. Resiliently deformable outer layer 304 extends along and around the side wall of core portion 302. Outer layer 304 is formed of a mesh-like lattice structure with interconnecting cross-members and a plurality of recesses. Arranged extending perpendicularly from the outer face of outer layer 304 are diametrically opposed cylindrical bayonet fixing projections 306.

Referring specifically to FIGS. 2 and 3, there is shown the engagement of a tool 400 with the recess of pin 100. Tool 400 has recess engaging portion 402 and blocking projections 404. Engaging portion 402 is formed of a projection that has an oval shaped lateral cross-section of substantially the same shape but of slightly smaller lateral dimensions than the recess 220 of head 200. The pair of oppositely extending blocking projections 404 are spaced inwardly from engaging portion 402 and extend perpendicularly away therefrom.

As shown in FIG. 2, where top wall 206 of cap 204 is in a first raised position, the upper face of top wall 206 provides a substantially smooth surface over recess 220. No sharp angles or deep recesses where dirt may gather exist in the surface.

As shown in FIG. 3, top wall 206 of cap 204 may resiliently deform to a second lowered position such that the upper face of top wall 206 forms relatively sharp angles and a deep recess according to the profile of recess 220.

In use, a portion of top wall 206 is deformed from the first position to the second position by the insertion of tool 400 in direction X. Under this force top wall 206 is deformed to the profile of recess 220.

Projections 404 are arranged inwardly of engaging projection 402 such that engaging projection 402 may by inserted into top wall 206 to a degree sufficient to allow pin 100 to co-rotate upon rotation of tool 400. Excess stress on the deformed part of top wall 206 is mitigated by engagement of the blocking projections with a portion of top wall 206 that is arranged over the solid surface of head 200 and over recess 220. Thus further progression of tool 400 into recess 220 is blocked.

Upon removal of tool 400 from recess 220, top wall 206 returns to the first raised position.

Figure 4:
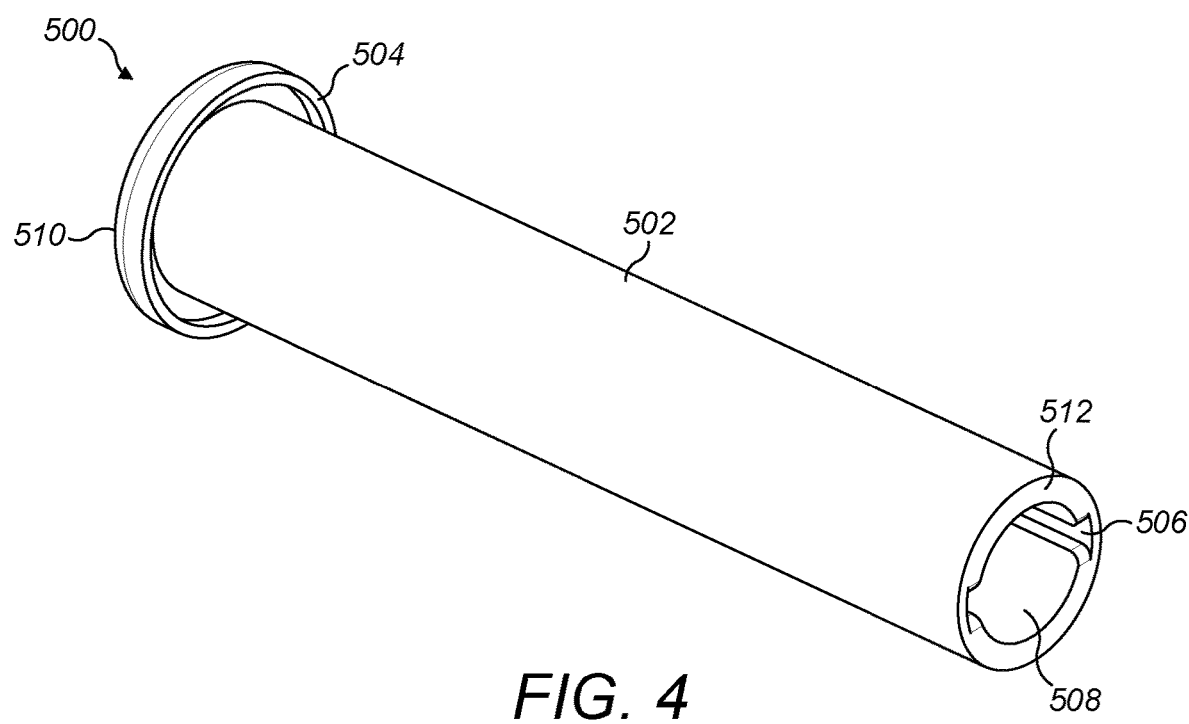
FIG. 4 shows a perspective view of a sheath.

Referring now to FIG. 4 there is shown sheath 500. Sheath 500 is formed of cylindrical wall 502, cylindrical wall 502 having a closed end 510 and open end 508. Closed end 510 has flange 504 arranged around the upper edge thereof, flange 504 extending perpendicularly from the edge of closed end 510 relative to wall 502. Diametrically opposed open end 508 has bore 512 extending inwardly there form. Arranged along a portion of the inner face of wall 502 and extending longitudinally from the upper edge of open end 508 are diametrically opposed channels 506. Channels 506 both comprise an end portion (not shown) that extends substantially perpendicularly away from the main body of the channel.

In use, pin 100 may be inserted shank-end first into bore 508 through the open end 510 of sheath 500. As pin 100 is inserted channels 506 receive a respective bayonet projection 306. Pin 100 slides into bore 508 until bayonet projections 306 abut the bend of the respective channel 506. At this stage, pin 100 may be rotated about its longitudinal axis to engage the bayonet projections with the end portion of the respective channel such that pin 100 may not be removed from sheath 500 without reverse rotation of the pin 100.

In the present embodiment, pin 100 may be used to connect the railing and post of a barrier system (not shown). A coupling is arranged in the railing's cavity and extends through an aperture in the post into the cavity of the post. Pin 100 can be used to secure the coupling in position within the cavity of the railing.

In use with such a barrier system, sheath 500 is inserted through an aperture in the railing and the coupling (not shown). Pin 100 is inserted through an opposing set of apertures such that pin 100 may be inserted into the bore 508 of sheath 500 to the point at which bayonet projections 306 abut the bend of the respective channel 506. At this stage the upper face of the closed end 510 of sheath 500 is substantially flush with an upper face of the rail. Likewise, the upper face of top wall 206 of cap 204 is substantially flush with an upper face of the rail.

To fix pin 100 in position, tool 400 may engage recess 220 as described above to allow co-rotation of pin 100 with tool 400 such that bayonet projections 306 are locked into the end portion of respective channels 506. Upon locking of the pin within the sheath, there is formed a locked barrier system wherein the upper face of the head 200 of pin 100 is substantially flush with an upper face of the rail and wherein the upper face of the head 200 does not comprises sharp angles or deep recesses where dirt and the like could collect and which prevent simple cleaning.

Pin 100 may be removed to allow the associated part of the barrier system to be disassembled by re-insertion of tool 400 in the manner described above and counter-rotation according to the practice commonly known in the art.

Although a few preferred embodiments have been shown and described, it will be appreciated by those skilled in the art that various changes and modifications might be made without departing from the scope of the invention, as defined in the appended claims.

The invention claimed is:

1. A pin comprising
a tool engagement portion and a resiliently deformable cover arranged over the tool engagement portion, wherein:
the resiliently deformable cover is operable to deform from a first raised position to a second lowered position to allow for the engagement of the tool engagement portion with a tool,
the resiliently deformable cover in the first position comprises a ridge of resiliently deformable material,
the ridge is a thickest portion of a top wall of the cover relative to other portions of the top wall of the cover radially outside the ridge; and
the ridge extending at least partially around substantially the periphery of the tool engagement portion.

2. The pin according to claim 1, wherein the resiliently deformable cover provides a substantially smooth surface in the first position.

3. The pin according to claim 1, wherein the pin includes a head and a shank, one face of the head includes the tool engagement portion and the resiliently deformable cover is operable in the first position to provide a substantially smooth surface over said face of the head of the pin.

4. The pin according to claim 1, wherein the pin further comprises a lip, wherein the lip engages with the resiliently deformable cover such that the cover is overstretched.

5. The pin according to claim 1, wherein the resiliently deformable cover is in the form of a cap, wherein the cap forms a tight abutting fit around the pin.

6. The pin according to claim 1, wherein the resiliently deformable cover has a thickness and deforms to the lowered position by moving at least three times the thickness.

7. The pin according to claim 1, wherein the tool engagement portion comprises a recess.

8. The pin according to claim 7, wherein the recess of the tool engagement portion has a substantially curved perimeter.

9. The pin according to claim 7, wherein the recess extends along substantially the whole longitudinal length of the pin.

10. The pin according to claim 1, wherein the pin further comprises bayonet locking means operable to secure the pin in position upon locking rotation of the pin.

11. The pin according to claim 1, wherein the pin is configured to be secured to a sheath, the sheath operable to be inserted in the opposite end of the aperture through which the pin is to be inserted, or operable to be inserted through an aperture substantially opposite the aperture through which the pin is to be inserted, and wherein upon locking rotation of the pin within the sheath the pin is secured in position.

12. The pin according to claim 11, wherein the sheath comprises a flanged closed end.

13. The pin according to claim 1, wherein the resiliently deformable cover is in the form of a cap that is formed of the top wall and a skirt extending perpendicularly from an edge of the top wall.

14. A kit of parts comprising a pin according to claim 1, and a tool operable to engage the tool engagement portion of the pin such that, when engaged, rotation of the tool causes rotation of the pin.

15. A kit of parts according to claim 14, wherein the tool comprises projections operable to limit the depth of the insertion of the tool into the tool engagement portion of the pin, in use.

\* \* \* \* \*